US008326776B2

(12) United States Patent
Dong et al.

(10) Patent No.: US 8,326,776 B2
(45) Date of Patent: Dec. 4, 2012

(54) NETWORK-BASED METHOD AND APPARATUS FOR FILTERING JUNK MESSAGES

(75) Inventors: Qijiang Dong, Hangzhou (CN); Yongming Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 693 days.

(21) Appl. No.: 12/443,371

(22) PCT Filed: Aug. 27, 2007

(86) PCT No.: PCT/CN2007/070563
§ 371 (c)(1),
(2), (4) Date: Nov. 11, 2009

(87) PCT Pub. No.: WO2008/037207
PCT Pub. Date: Apr. 3, 2008

(65) Prior Publication Data
US 2010/0058178 A1      Mar. 4, 2010

(30) Foreign Application Priority Data

Sep. 30, 2006   (CN) .......................... 2006 1 0140726

(51) Int. Cl.
*G06N 5/00*   (2006.01)
(52) U.S. Cl. ........................................... 706/12; 706/45
(58) Field of Classification Search .................... 706/12, 706/45
See application file for complete search history.

(56) References Cited

U.S. PATENT DOCUMENTS

| | | | |
|---|---|---|---|
| 6,161,130 A | 12/2000 | Horvitz et al. | |
| 6,321,267 B1 | 11/2001 | Donaldson | |
| 6,732,157 B1 | 5/2004 | Gordon et al. | |
| 7,051,077 B2 | 5/2006 | Lin | |
| 7,206,814 B2 | 4/2007 | Kirsch | |
| 7,464,264 B2 | 12/2008 | Goodman et al. | |
| 2004/0210640 A1 | 10/2004 | Chadwick et al. | |
| 2004/0260776 A1 | 12/2004 | Starbuck et al. | |

(Continued)

FOREIGN PATENT DOCUMENTS

CN       1486109 (A)       3/2004

(Continued)

OTHER PUBLICATIONS

King, Using Information Above the Word Level for Automatic Speech Recognition, Doctoral Thesis, University of Edinburgh, 1998, pp. 1-185.*

(Continued)

*Primary Examiner* — Wilbert L Starks
(74) *Attorney, Agent, or Firm* — Lee & Hayes, PLLC

(57) ABSTRACT

The present invention discloses a network-based method and system for filtering a junk message. The method includes the following procedures: word-segmenting a target message to obtain characteristic elements within the target message; obtaining probabilities of the characteristic elements in the target message according to a predefined keyword library, the keyword library being updated periodically; and accumulating the probabilities of the characteristic elements in the target message, comparing accumulated probabilities with a predetermined threshold, and concluding the target message is a junk message if the result is greater than the predetermined threshold. Using a predefined keyword library for verification of a target message avoids time delay and system resource waste caused by massive and complicated computations during message verification in existing technologies, thus satisfying the requirement of real-time filtering of junk messages.

13 Claims, 2 Drawing Sheets

U.S. PATENT DOCUMENTS

| | | | |
|---|---|---|---|
| 2006/0031306 | A1 | 2/2006 | Haverkos |
| 2006/0036693 | A1 | 2/2006 | Hulten et al. |
| 2006/0095966 | A1 | 5/2006 | Park |
| 2006/0123083 | A1 | 6/2006 | Goutte et al. |
| 2007/0011323 | A1 | 1/2007 | Gaal |
| 2007/0078936 | A1 | 4/2007 | Quinlan et al. |

FOREIGN PATENT DOCUMENTS

| | | |
|---|---|---|
| CN | 1696943 (A) | 11/2005 |
| CN | 1794719 (A) | 6/2006 |
| CN | 1852471 (A) | 10/2006 |
| CN | 101068154 (A) | 11/2007 |
| CN | 101150762 (A) | 3/2008 |
| EP | 1613010 A2 | 1/2006 |
| JP | 2003067304 | 3/2003 |
| JP | 2006221586 | 8/2006 |
| WO | WO99/32985 | 7/1999 |

OTHER PUBLICATIONS

Tokuyasu, Turbo Recognition: An Approach to Decoding Page Layout, Doctoral Thesis, Report No. UCB/CSD-2-1172, Computer Science Division (EECS), University of California, Berkeley, Jan. 2002, pp. 1-125.*

The Chinese Office Action mailed Feb. 5, 2010 for Chinese patent application No. 2006101407260, a counterpart foreign application of U.S. Appl. No. 12/443,371, 17 pages.

The Extended European Search Report mailed Aug. 25, 2011 for European Patent Application No. 07785460.2, 7 pages.

Translated Japanese Office Action mailed Nov. 22, 2011 for Japanese patent application No. 2009-529502, a counterpart foreign application of U.S. Appl. No. 12/443,371, 9 pages.

Liu, et al., "Research on Mail Filter Algorithm Based on Bayes Probability Model", Journal of Chongqing University of Posts and Telecommunication (Natural Science), vol. 17, No. 5, Oct. 2005, pp. 636-639.

Nakamichi, "Filtering is Basic and Transmitter's Authentication is Expected to Prevent Spam/Phishing", NIKKEI BYTE, No. 259, pp. 92-100, Niccei Business Publications, Inc., Nov. 22, 2004, Japan.

Xie, "Study and Implementation of Spam Filtering Technologies in Email Server", Guangdong University of Technology (Master Dissertation), 2005, 5 pgs.

Xu, "Applied Research of Bayesian Method on the Technology of Anti-Spam", Chengdu University of Technology (Master Dissertation), Sep. 2005, 3 pgs.

* cited by examiner

NETWORK-BASED METHOD AND APPARATUS FOR FILTERING JUNK MESSAGES

This application claims priority from Chinese patent application, Application No. 200610140726.0, filed on Sep. 30, 2006 in China Patent Office, entitled "NETWORK-BASED METHOD AND APPARATUS FOR FILTERING JUNK MESSAGES", and incorporates the Chinese patent application in its entirety by reference.

TECHNICAL FIELD

The present invention relates to message filtering technologies, and particularly to network-based methods and systems for filtering junk messages.

BACKGROUND ART

Along with the development of computer and communication technologies, Internet has become a very important means for propagating and communicating information in people's work and life today thanks to its characteristics such as real-time, fast and convenient, rich in content, and having no time and space limitation. Examples of such information propagation and communication include online media, bulletin board system (BBS), instant messaging (IM) and electronic mails. Proliferation of junk messages, however, has greatly frustrated people who regularly use these tools, wasting not only network bandwidth and memory space, but also time and energy of users.

Existing methods used for filtering junk message are usually filtering methods based on Bayesian algorithm. A method of this type collects a large amount of junk messages and non-junk messages as sample messages, performs word segmentation on these sample messages, computes frequencies and probabilities of characteristic elements obtained, and builds a junk message hash table and a non-junk message hash table. The method finally computes each characteristic element's probability of being a junk message, and builds a new hash table which is used as a basis for verifying whether a target message is a junk message. If a new target message needing verification is received, the method re-compute and re-build the junk message hash table and the non-junk message hash table based on results of verification and word segmentation of the new target message. A new hash table is then created as a basis for verifying a subsequent target message.

However, the above junk message filtering method is not suitable for an application environment that has a large number of sample messages and has a high demand for instantaneous processing. For example, if the number of junk messages and the number of non-junk messages are each one hundred thousand, with each individual message of a 4 k length and five hundred words, the junk message hash table and the non-junk message hash table built will occupy a huge amount of space. Each time when junk message verification is performed on a new target message, the above-described method will re-build the junk message hash table and the non-junk message hash table based upon the results of the verification and word segmentation of the message, and use these two hash tables to create a new hash table by computing each characteristic element's probability of being a junk message. The new hash table is then used as a basis for verifying a subsequent target message. This massive computation occupies a large amount of system resources and time, causing delays which severely hamper verification of the subsequent target message. This may eventually render the real-time filtering of junk messages impossible.

DESCRIPTION OF THE INVENTION

The present invention provides a network-based method and system for filtering a junk message, and helps to solve the problem of existing technologies in filtering junk messages in real time.

In order to solve the aforementioned problem, this invention discloses a network-based method for filtering a junk message, the method includes the following procedures:

word-segmenting a target message to obtain characteristic elements within the target message;

obtaining probabilities of the characteristic elements in the target message according to a predefined keyword library, the keyword library being updated periodically; and accumulating the probabilities of the characteristic elements in the target message, comparing accumulated probabilities with a predetermined threshold, and concluding the target message is a junk message if the result is greater than the predetermined threshold.

Preferably, the keyword library is updated periodically using sample junk messages and sample non-junk messages that have been collected. A junk message hash table and a non-junk message hash table are separately created according to predetermined characteristic word groups and/or characteristic phrases. The hash tables store the characteristic elements obtained by word-segmentation of the sample messages, and the frequencies of the characteristic elements in the sample messages.

The keyword library is created based upon the junk message hash table and the non-junk message hash table. The keyword library stores the characteristic elements of the sample messages, and the junk message probabilities of respective characteristic elements of the sample messages.

The characteristic elements in the keyword library include, but are not limited to, characteristic words, characteristic word groups, and/or characteristic phrases.

Preferably, the method further includes: parsing the keyword library into a keyword hash table, and obtaining the probabilities corresponding to the characteristic elements of the target message according to the keyword hash table.

Preferably, the method further includes:

separately storing the characteristic elements and the corresponding probabilities into a characteristic word hash table, a characteristic word group hash table, and/or a characteristic phrase hash table according to the keyword hash table; and accumulating the probabilities of the characteristic elements in the characteristic word hash table, the characteristic word group hash table, and/or the characteristic phrase hash table, comparing the accumulated probabilities with a predetermined threshold, and concluding the target message is a junk message if the accumulated probabilities is greater than the predetermined threshold.

Preferably, the method further includes:

if a characteristic element or a composition including the characteristic element exists in the characteristic word hash table, the characteristic word group hash table and the characteristic phrase hash table at the same time, counting only the corresponding probability of the characteristic element in the characteristic phrase hash table; and if a characteristic element or a composition including the characteristic element exists in the characteristic word hash table and the characteristic word group hash table at the same time, counting only the corresponding probability of the characteristic element in the characteristic word group hash table.

The threshold is determined upon the probabilities of the characteristic elements of the junk messages and the non-junk messages obtained from the keyword library. Probability of each sample message is compared with the threshold. If the sample message is a junk message and the probabilities of the characteristic elements are greater than the threshold, it is counted as a correct determination. Otherwise, it is counted as an incorrect determination. If the sample message is a non-junk message and the probabilities of the characteristic elements are smaller than the threshold, it is counted as a correct determination. Otherwise, it is counted as an incorrect determination.

Based on the above counted determination results of the sample junk messages and the sample non-junk messages, an accuracy rate is computed. If the accuracy rate is smaller than a predetermined value, the threshold is adjusted, and the foregoing steps are repeated until the accuracy rate is greater than the predetermined value.

The present invention further discloses a network-based apparatus for filtering a junk message, and the apparatus includes:

a word-segmentation unit used for word-segmenting a target message and obtaining characteristic elements of the target message;

a keyword library used for storing the characteristic elements of the target message obtained by the word-segmentation unit, and junk message probabilities of the characteristic elements;

a keyword creation unit used for creating the keyword library, and updating the keyword library in a predetermined time interval;

a computation unit used for obtaining probabilities corresponding to the characteristic elements from the keyword library based on the characteristic elements of the target message obtained by the word-segmentation unit, and for accumulating the probabilities; and a comparison unit used for comparing the accumulated probability obtained by the computation unit with a predetermined threshold, and for concluding that the target message is a junk message if the probability is greater than the predetermined threshold.

The apparatus further includes a collection unit used for collecting sample junk messages and sample non-junk messages, and a storage unit used for storing the sample junk messages and the sample non-junk messages collected by the collection unit, and for storing the predetermined threshold.

The storage unit is further used for storing characteristic word groups and characteristic phrases. The keyword library creation unit creates the keyword library based on the sample junk messages and the sample non-junk messages stored in the storage unit, and also based on the characteristic word groups and the characteristic phrases.

Preferably, the apparatus may further include a hash table creation unit used for parsing the keyword library into a keyword hash table, and for creating a characteristic word hash table, a characteristic word group hash table, and a characteristic phrase hash table.

Preferably, the apparatus may further include a threshold setup unit used for predetermining the threshold based upon the keyword library and the sample junk messages and the sample non-junk messages in the storage unit.

Compared with existing technologies, the present invention has the following advantages:

First, when verifying whether a target message is a junk message, the present invention uses a pre-generated keyword library to obtain probabilities of characteristic elements of the target message for comparison, thus avoiding time wasting caused by a re-computation of all sample messages each time when a target message is verified in existing technologies. Therefore, the present invention avoids time delays which severely affect the verification of subsequent target message in the existing technologies, and cause failure of the existing technologies to satisfy the real-time processing requirement. The number of sample messages in application environment of this invention is usually tremendous, e.g., one hundred thousand sample junk messages and one hundred thousand sample non-junk messages, with each message of a 4 k length and five hundred words. If existing technologies are used, each time when a sample message is verified, characteristic elements obtained by word-segmenting the message are needed to add into a junk message hash table and a non-junk message hash table based on verification result of the message. A new hash table is then re-computed and created using the former two hash tables to provide a basis for verifying whether subsequent target message is a junk message. The large amount of resources and time used may lead to a failure of real-time filtering of junk messages. In contrast, given the same number of sample messages, the keyword library used in the present invention during message verification only stores about five thousand characteristic elements, with each element of a length 0.1 k, thus greatly reducing the workload of a system during filtering. Using the present invention allows verification of one hundred target messages each with 4 k in length in a second.

Second, the present invention uses predefined characteristic word groups and characteristic phrases to create a keyword library based on sample junk messages and sample non-junk messages. Because the characteristic word groups and the characteristic phrases are set up and maintained manually, the keyword library created thereupon has more precise characteristic elements. This further improves the accuracy of junk message filtering in the present invention.

EXEMPLARY EMBODIMENTS

Prior to describing the method disclosed in the present invention using exemplary embodiments, a few concepts involved in the word-segmentation of this invention are first introduced.

Characteristic word: a character in Chinese, or a word in English. For example, there are six characteristic words in "wo shi yi ge xue sheng" and four words in "I am a student".

Characteristic phrase: formed by a plurality of words having positional relationship, e.g., "xue sheng" or "a student".

Characteristic word group: formed by a plurality of words having no positional relationship.

Furthermore, in order to improve the efficiency of information search, the present invention preferably uses hash tables for storing word-segmentation results and related information. A hash table, also called hashtable, is an important linear table for storage and searching. A hash table allows fast searching on its nodes. The fundamental concept of a hash table algorithm is to have a storage address of a node determined by the corresponding key value of the node. Specifically, a key value k is an independent variable, and is used to compute, through a certain functional relation h (i.e., hash function), a corresponding function value h(k). The function value h(k) is interpreted as the storage address of the node, where the node is stored. During a search, the same hash function is used to compute an address based on a key value of the search, and requested nodal data can then be obtained at that address. Therefore, an important characteristic of a hash table is that its average search length does not directly depend on the number of elements in the table.

The method for filtering a junk message in accordance with the present invention is described below using exemplary embodiments.

The method for filtering a junk message disclosed in this invention includes: word-segment a target message to obtain characteristic elements within the target message; obtain probabilities of the characteristic elements in the target message from a predefined keyword library, which is updated periodically; and accumulate the probabilities of the characteristic elements in the target message, compare a result of accumulation with a predetermined threshold, and conclude that the target message is a junk message if the comparison result is greater than a predetermined threshold.

Figure 1:
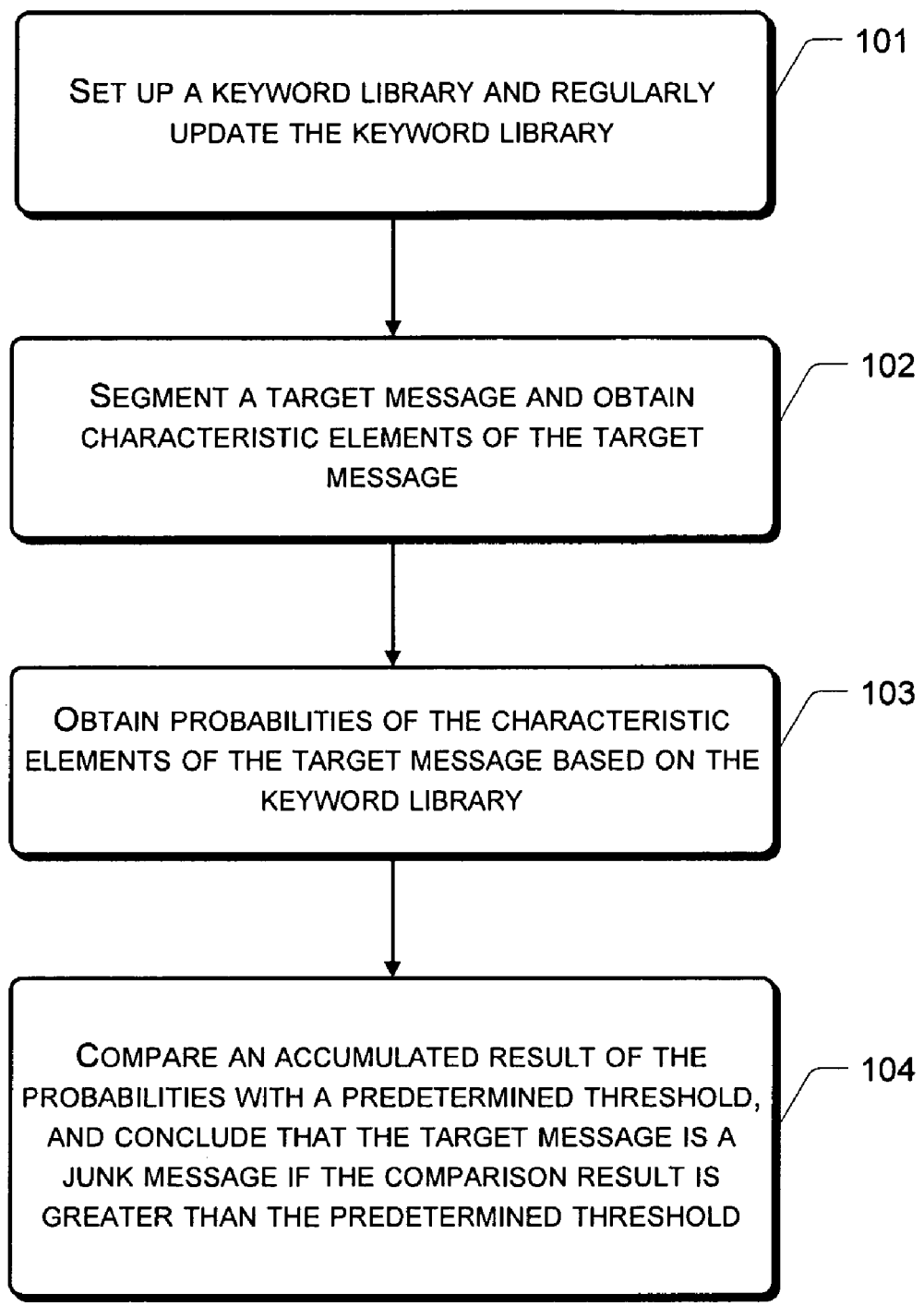
FIG. 1 shows a dataflow diagram illustrating network-based filtering of a junk message in accordance with the present invention.

FIG. 1 shows a dataflow diagram of a method for filtering a junk message in accordance with the exemplary embodiment of the present invention. In the following, the exemplary embodiment of the present invention is described in detail with reference to FIG. 1.

Step 101: Presets a keyword library. The key would library is updated periodically.

The keyword library stores characteristic elements which are obtained by word-segmenting sample messages, and probabilities of the characteristic elements being a junk message.

Given a sentence, a person can understand which part is a phrase and which is not based on his/her knowledge. However, how can a computer come to this understanding? The process to achieve this is word-segmentation. Commonly used word-segmentation methods include that which are based on word string matching, and that which are based on statistics.

The method based upon word string matching is to match a word string to be analyzed with entries in a sufficiently large lexical dictionary according to a certain strategy. If a certain word string is found in the lexical dictionary, matching is successful (i.e., a word is recognized). Depending on scanning directions, the word-segmentation method based on word string matching may be divided into forward matching and backward matching. The word string matching based word-segmentation method may also be divided into maximum (longest) matching and minimum (shortest) matching based on matching according to priorities on lengths. Depending on whether combined with lexical tagging of part of speech, the word string matching based word-segmentation method may also be divided into a simple word-segmentation method and an integrated method of word-segmentation and lexical tagging. Of course, any combination of the above methods may also be used.

In a view of formality, a phrase is a steady combination of words. Therefore, the greater the number of times adjacent words co-occurring in a context, the more likely these adjacent words form a phrase. As a result, the frequency or probability of adjacent co-occurrence of words can fairly reflect the degree of certainty that these words form a phrase. Therefore, statistics can be taken on the frequencies of each combination of adjacent and co-occurring words within the target message to compute respective co-occurrence information. Co-occurrence information of two words is defined, and computed as a probability of adjacent co-occurrence of two words (or characters) X and Y. The co-occurrence information represents the degree of association between words. If the degree of association is greater than a certain threshold, the corresponding word group may be considered to be a phrase. This method, which only requires computing frequencies of word groups within a target message without the need of word-segmentation and a lexicon dictionary, is therefore called statistics-based word-segmentation method.

Naturally, a technician in the art may use any segmentation method to word-segment a target message according to the needs. The present invention does not impose any restriction on this matter.

Preferably, the present invention creates the keyword library according to the following method:

1) collect a large amount of junk messages and non-junk messages as sample messages, and create a junk message set and a non-junk message set;

2) word-segment the messages, obtain characteristic elements in the messages, and computing frequencies of the characteristic elements, i.e., word frequencies; processing all messages in the junk message set and the non-junk message set accordingly;

3) create hash tables, hashtable_good for non-junk message set, and hashtable_bad for junk message set according to the message sets, wherein the tables store mapping relationship from each characteristic element to its word frequency;

4) compute, for each characteristic element in each hash table, a probability p=(word frequency of a characteristic element)/(length of corresponding hash table);

5) determine, combinedly considering hashtable_good and hashtable_bad, a probability that a new text message is a junk message if a certain characteristic element appears in the message. The mathematical formula is:

Event A: message is a junk message; t1, t2 . . . tm represent characteristic elements, and P (A|ti) represents a probability that the message is a junk message if characteristic element ti appears in the message.

Let

P1(ti)=(value of ti in hashtable_good)

P2(ti)=(value of ti in hashtable_bad)

Then P (A|ti)=P2(ti)/[P1(ti)+P2(ti)];

6) create a new hash table, hashtable_probability, for storing a mapping relationship from ti to P (A|ti) based upon the above result;

Take a junk message A which contains a Chinese phrase "FaLunGong", and a non-junk message B which contains "FaLv", for example. Based upon the message A, hashtable_bad is created and records in this hash table are:

| | |
|---|---|
| Fa: | 1 time |
| Lun: | 1 time |
| Gong: | 1 time |

According to a result above, it is computed that in the present hash table:

the probability that "Fa" appears is 0.3, the probability that "Lun" appears is 0.3, and the probability that "Gong" appears is 0.3.

Based upon the message A, hashtable_good is created and records in this hash table are:

| | |
|---|---|
| Fa: | 1 time |
| Lv: | 1 time |

It is computed that in current hash table:
the probability that "Fa" appears is 0.5
the probability that "Lv" appears is 0.5

Combining these two hash tables, there are four characteristic elements: FA, LUN, GONG, and LV. If "FA" appears in a message, the probability that this message is a junk message is:

$$P=0.3/(0.3+0.5)=0.375;$$

If "Lun" appears:

$$P=0.3/(0.3+0)=1;$$

If "Gong" appears:

$$P=0.3/(0.3+0)=1;$$

If "Lv" appears:

$$P=0/(0+0.5)=0.$$

From above, a third hash table, hashtable_probability, is obtained which has the following data:
Fa: 0.375
Lun: 1
Gong: 1
Lv: 0

In the above process, the present invention may preferably create the keyword library using predetermined characteristic word groups and characteristic phrases for more accurate result.

The characteristic phrases and the characteristic word groups are set up in advance and stored in a XML document as follows:

```
<?xml version="1.0" encoding="UTF-8"?>
<keywords>
<key_phrase>
<item word=" FaLunGong"/>
<item word="FaLun"/>
</key_phrase>
<key_group>
<item word="Fa Lun Gong Jing Zuo"/>
<item word="Fa Lun Gong"/>
</key_group>
</keywords>
```

Characteristic phrases are defined in <key_phrase> node, while characteristic words group are defined in <key_group> node. When a sample junk message is analyzed, the message is first word-segmented according to the method described above, and corresponding probabilities are computed to create hashtable_bad. A characteristic phrase or a characteristic word group is fetched from the XML document, and the sample junk message is examined whether the characteristic phrase or the characteristic word group exists. If it exists, corresponding characteristic phrase or corresponding characteristic word group is added to hashtable_bad, and probability of the characteristic phrase or the characteristic word group appearing in the hash table is computed. All sample junk messages and sample non-junk messages are processed accordingly using the same method to complete the creation of hashtable_bad and hashtable_good.

Hashtable_probability is created based on the above two hash tables, and is used for storing the characteristic elements and the junk message probabilities of respective characteristic elements. A storage format using XML document is as shown below:

```
<?xml version="1.0" encoding="UTF-8"?>
<keywords>
<key_word>
<item word="Fa" value="0.375"/>
<item word="Lun" value="1"/>
<item word="Gong" value="1"/>
</key_word>
<key_phrase>
<item word="FaLunGong" value="1"/>
<item word="FaLun" value="0.49"/>
</key_phrase>
<key_group>
<item word="Fa Lun Gong Jing Zuo" value="0.65"/>
<item word="Fa Lun Gong" value="0.45"/>
</key_group>
</keywords>
```

The XML document described above is the keyword library in this invention. The present invention re-generates the keyword library based on newly collected sample junk messages and sample non-junk messages in a predetermined time interval. In accordance with the present invention, the process of generating the keyword library is independently performed. Therefore, at the time when the keyword library is required, the keyword library has already been created and can be used directly. For example, the keyword library can be created using an independent thread or server.

Step 102: A target message is word-segmented to obtain characteristic elements in the message.

A target message is a message needed to be verified to be a junk or not in the present invention. Depending on the content of the target message, the characteristic element may be a word, a word group, or a phrase, etc.

Step 103: Probabilities of the characteristic elements of the target message are obtained from the keyword library.

In order to improve search efficiency, the present invention preferably parses the XML document storing the keyword library into a keyword hash table, hash_keywords, and saves hash_keywords into memory. The hash_keywords includes the following content:

Name: name of a characteristic element

Value: corresponding probability of the characteristic element

Type: type of the characteristic element, e.g., a word, a word group, a phrase, a word within a word group, a word within a phrase Position: relational position of a word within a phrase if Type is "a word within a phrase"

Three temporary hash tables, hash_word, hash_group and hash_phrase are created. Each characteristic element of the target message is then examined to determine whether corresponding characteristic element exists in hash_keywords. If exists, the probability corresponding to the characteristic element is obtained. The characteristic element and its probability are then stored in one of the three temporary hash tables according to corresponding type of the characteristic element.

Step 104: The probabilities of the characteristic elements in the target message are accumulated. The result of accumulation is compared with a predetermined threshold. If the result is greater than the predetermined threshold, the target message is considered to be a junk message.

The probability of each characteristic element is separately obtained from the three temporary hash tables and accumulated. Preferably, the present invention computes the accumulation according to the following method: if a characteristic element exists in hash_phrase, hash_group and hash_word at the same time, only value in hash_phrase is counted. If a characteristic element exists in hash_group and hash_word at the same time, only value in hash_group is counted. This will effectively avoid double counting and hence improve the accuracy of the computed result.

Preferably, the threshold is set adjustably based on the probabilities obtained and the sample messages. For example, assume there are one hundred thousand sample junk messages and one hundred thousand non-junk messages. A threshold is first set up. Based on the keyword library, all the sample messages are determined upon the threshold to obtain the number of correct determinations and the number of incorrect determinations. The threshold is then automatically adjusted and the above determination process is repeated until the percentage of correctness is greater than 99.99% and the percentage of error is smaller than 0.1%. The resulting threshold is then set to be the threshold used in an actual application.

Figure 2:
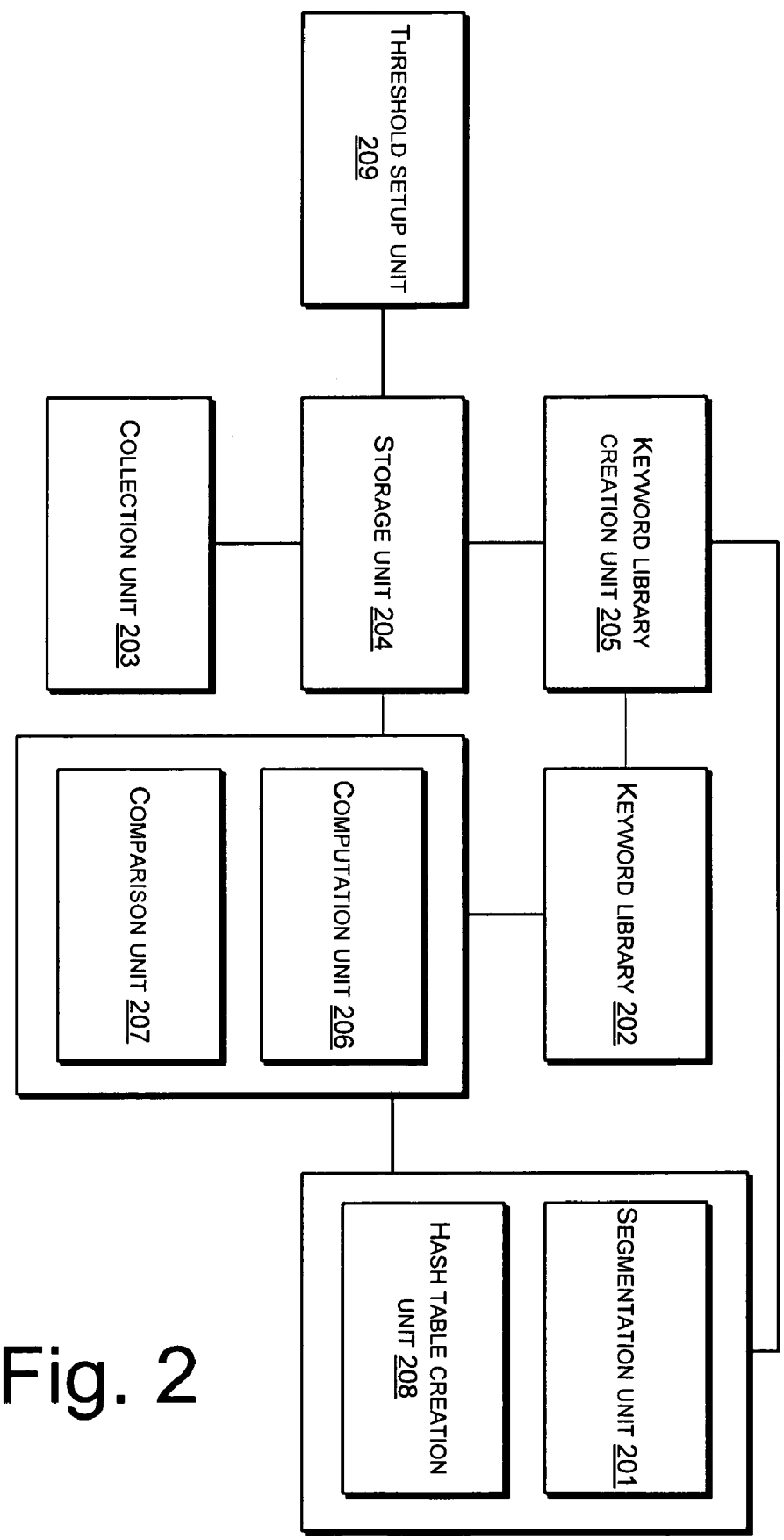
FIG. 2 shows a structural schematic diagram of a network-based apparatus for filtering a junk message in accordance with the present invention.

FIG. 2 illustrates an apparatus for filtering a junk message in accordance with the present invention. The apparatus includes at least the following:

a word-segmentation unit 201 for word-segmenting a target message and obtaining characteristic elements of the target message;

a keyword library 202 for storing the characteristic elements of the target message obtained by the word-segmentation unit 201 and junk message probabilities of the characteristic elements;

a keyword creation unit 205 for creating the keyword library 202 and updating the keyword library 202 in a predetermined time interval;

a computation unit 206 for obtaining the probabilities corresponding to the characteristic elements from the keyword library 202 based on the characteristic elements of the target message obtained by the word-segmentation unit 201, and for accumulating the probabilities; and a comparison unit 207 for comparing the accumulated probability obtained by the computation unit 206 with a predetermined threshold, and concluding that the target message is a junk message if the probability is greater than the predetermined threshold.

The apparatus further includes:

a collection unit 203 for collecting sample junk messages and sample non-junk messages;

a storage unit 204 for storing the sample junk messages and the sample non-junk messages collected by the collection unit 203, and for storing the predetermined threshold.

The storage unit 204 is further used for storing characteristic word groups and characteristic phrases.

The keyword library creation unit 205 creates the keyword library 202 based on the sample junk messages and the sample non-junk messages stored in the storage unit 204, and also based on the characteristic word groups and the characteristic phrases.

Preferably, the apparatus may further include: a hash table creation unit 208 for parsing the keyword library 202 into a keyword hash table, and for creating a characteristic word hash table, a characteristic word group hash table and a characteristic phrase hash table.

Preferably, the apparatus may further include: a threshold setup unit 209 for predetermining the threshold based on the keyword library 202 and the sample junk messages and the sample non-junk messages in the storage unit 204.

For any detail that may have been left out in the above description of the apparatus in this invention, one may refer to the related sections in the foregoing parts of the present disclosure.

The method and apparatus for filtering a junk message in the present invention have been described in detail above. Exemplary embodiments are employed to illustrate the concept and implementation of the present invention in this disclosure. The exemplary embodiments are only used for better understanding of the method and core concepts of the present invention. Based on the concepts of this invention, a person of ordinary skills in the art may make modifications to the practical implementation and application areas. In conclusion, the content of this description should not be interpreted as limitations to the present invention.

The invention claimed is:

1. A network-based method for filtering a junk message, characterized in that the method comprises:

word-segmenting a target message to obtain characteristic elements within the target message;

obtaining probabilities of the characteristic elements in the target message according to a predefined keyword library, the keyword library being updated periodically; and accumulating the probabilities of the characteristic elements in the target message, comparing accumulated probabilities with a predetermined threshold, and concluding the target message is a junk message if the result is greater than the predetermined threshold.

2. The method as recited in claim 1, characterized in that:

the periodically updating the keyword library is based on collected sample junk messages and sample non-junk messages and comprises creating a junk message hash table and a non-junk message hash table according to predetermined characteristic word groups and/or characteristic phrases, wherein the hash tables store characteristic elements obtained by word-segmentation of the sample messages and frequencies of the characteristic elements in the sample messages; and the keyword library is created based upon the junk message hash table and the non-junk message hash table, and stores the characteristic elements of the sample messages, and junk message probabilities of characteristic elements of the sample messages.

3. The method as recited in claim 2, characterized in that the characteristic elements in the keyword library comprise characteristic words, characteristic word groups, and/or characteristic phrases.

4. The method as recited in claim 3, characterized in that the method further comprises:

parsing the keyword library into a keyword hash table, and obtaining probabilities corresponding to the characteristic elements of the target message from the keyword hash table.

5. The method as recited in claim 4, characterized in that the method further comprises:

according to the keyword hash table, separately storing the said characteristic elements and the corresponding probabilities in a characteristic word hash table, a characteristic word group hash table, and/or a characteristic phrase hash table; and accumulating the probabilities of the characteristic elements in the characteristic word hash table, the characteristic word group hash table, and/or the characteristic phrase hash table, comparing the accumulated probabilities with a predetermined threshold, and concluding the target message is a junk message if the accumulated probabilities is greater than the predetermined threshold.

6. The method as recited in claim 5, characterized in that the method further comprises:

if a characteristic element or a composition including the characteristic element exists in the characteristic word hash table, the characteristic word group hash table and the characteristic phrase hash table at the same time, counting only the corresponding probability of the characteristic element in the characteristic phrase hash table; and if a characteristic element or a composition including the characteristic element exists in the characteristic word hash table and the characteristic word group hash table at the same time, counting only the corresponding probability of the characteristic element in the characteristic word group hash table.

7. The method as recited in claim 1, characterized in that the predetermined threshold is determined based on:

obtaining probabilities of the characteristic elements of the junk messages and the non-junk messages from the keyword library;

comparing the probabilities of the sample messages with the threshold;

counting a correct determination if the sample message is a junk message and the respective probabilities of the characteristic elements are greater than the threshold, and counting an incorrect determination otherwise;

counting a correct determination if the sample message is a non-junk message and the respective probabilities of the characteristic elements are smaller than the threshold, and counting an incorrect determination otherwise;

computing an accuracy rate based on the counted correct determinations and incorrect determinations of the sample junk messages and the sample non-junk messages;

if the accuracy rate is smaller than a predetermined value, adjusting the threshold; and repeating and the foregoing steps until the accuracy rate is greater than the predetermined value.

8. A network-based apparatus for filtering a junk message, characterized in that the apparatus comprises:

a word-segmentation unit, used for word-segmenting a target message and obtaining characteristic elements of the target message;

a keyword library, used for storing the characteristic elements of the target message obtained by the word-segmentation unit, and junk message probabilities of the characteristic elements;

a keyword creation unit, used for creating the keyword library, and updating the keyword library in a predetermined time interval;

a computation unit, used for obtaining from the keyword library probabilities corresponding to characteristic elements of the target message obtained by the word-segmentation unit, and for accumulating the obtained probabilities; and a comparison unit, used for comparing an accumulated probability obtained by the computation unit with a predetermined threshold, and concluding that the target message is a junk message if the accumulated probability is greater than the predetermined threshold.

9. The apparatus as recited in claim 8, characterized in that the apparatus further comprises:

a collection unit, used for collecting sample junk messages and sample non-junk messages; and a storage unit, used for storing the sample junk messages and the sample non-junk messages collected by the collection unit, and for storing the predetermined threshold.

10. The apparatus as recited in claim 9, characterized in that the storage unit is further used for storing characteristic word groups and characteristic phrases.

11. The apparatus as recited in claim 10, characterized in that the keyword library creation unit creates the keyword library based on the sample junk messages and the sample non-junk messages stored in the storage unit, and also based on the characteristic word groups and the characteristic phrases.

12. The apparatus as recited in claim 8, characterized in that the apparatus further comprises:

a hash table creation unit, used for parsing the keyword library into a keyword hash table, and creating a characteristic word hash table, a characteristic word group hash table, and a characteristic phrase hash table.

13. The apparatus as recited in claim 9, characterized in that the apparatus further comprises:

a threshold setup unit, used for predetermining the threshold based upon the keyword library, as well as the sample junk messages and the sample non-junk messages in the storage unit.

* * * * *